United States Patent
Maruyama et al.

(10) Patent No.: US 9,172,240 B2
(45) Date of Patent: Oct. 27, 2015

(54) ELECTRIC ROTATING MACHINE WITH LOAD DUMP PROTECTOR

(71) Applicant: DENSO CORPORATION, Kariya, Aichi-pref. (JP)

(72) Inventors: Toshinori Maruyama, Anjo (JP); Takatoshi Inokuchi, Kariya (JP); Asaka Kimura, Kariya (JP); Masaya Nakanishi, Toyohashi (JP)

(73) Assignee: DENSO CORPORATION, Kariya (JP)

( * ) Notice: Subject to any disclaimer, the term of this patent is extended or adjusted under 35 U.S.C. 154(b) by 57 days.

(21) Appl. No.: 13/969,907

(22) Filed: Aug. 19, 2013

(65) Prior Publication Data

US 2014/0055894 A1    Feb. 27, 2014

(30) Foreign Application Priority Data

Aug. 21, 2012   (JP) .................................. 2012-181994

(51) Int. Cl.
*H02H 9/04* (2006.01)
*H02P 9/10* (2006.01)

(52) U.S. Cl.
CPC . *H02H 9/04* (2013.01); *H02P 9/107* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,815,052 A | * | 3/1989 | Walker | 363/87 |
| 5,748,463 A | * | 5/1998 | Tsutsui et al. | 363/127 |
| 5,793,167 A | * | 8/1998 | Liang et al. | 318/141 |
| 6,275,012 B1 | * | 8/2001 | Jabaji | 322/22 |
| 6,433,519 B2 | * | 8/2002 | Taniguchi et al. | 322/28 |
| 6,700,353 B2 | * | 3/2004 | Asada | 322/28 |
| 6,867,569 B2 | * | 3/2005 | Taniguchi et al. | 322/28 |
| 7,081,738 B2 | * | 7/2006 | Muramatsu et al. | 322/24 |
| 8,541,988 B2 | * | 9/2013 | Horihata et al. | 322/21 |
| 8,547,071 B2 | * | 10/2013 | Horihata et al. | 322/21 |
| 8,570,004 B2 | * | 10/2013 | Asada et al. | 322/45 |
| 2003/0107353 A1 | * | 6/2003 | Nakamura et al. | 322/89 |
| 2007/0278966 A1 | | 12/2007 | Chemin et al. | |
| 2012/0001598 A1 | | 1/2012 | Horihata et al. | |
| 2012/0007568 A1 | * | 1/2012 | Horihata et al. | 322/21 |
| 2012/0074914 A1 | * | 3/2012 | Nakayama et al. | 322/94 |
| 2012/0091973 A1 | * | 4/2012 | Horihata | 322/29 |
| 2012/0098503 A1 | * | 4/2012 | Horihata et al. | 322/23 |
| 2014/0042990 A1 | * | 2/2014 | Maruyama et al. | 322/28 |
| 2014/0055894 A1 | * | 2/2014 | Maruyama et al. | 361/56 |
| 2015/0102782 A1 | * | 4/2015 | Nakayama et al. | 322/21 |

FOREIGN PATENT DOCUMENTS

| | | |
|---|---|---|
| JP | A-9-219938 | 8/1997 |
| JP | A-2008-512077 | 4/2008 |
| JP | A-2012-16158 | 1/2012 |

* cited by examiner

*Primary Examiner* — Thienvu Tran
*Assistant Examiner* — Angela Brooks
(74) *Attorney, Agent, or Firm* — Oliff PLC

(57) ABSTRACT

An electric rotating machine for a vehicle is equipped with a load dump protector. The load dump protector works to selectively perform a first and a second load dump protection operation to suppress a voltage surge arising from the load dump. When a rate at which an output voltage from the electric rotating machine is determined to be smaller than a given value, the load dump protector waits for stating the first load dump protection operation until the time when a voltage surge arising from changing of switching devices of a rectifier module of the electric rotating machine is expected to be suppressed and then performs the first load dump protection operation. When the rate is greater than the given value, the load dump protector immediately initiates the second load dump protection operation. This ensures the stability in eliminating the risk of a voltage surge arising from the load dump.

4 Claims, 11 Drawing Sheets

ELECTRIC ROTATING MACHINE WITH LOAD DUMP PROTECTOR

CROSS REFERENCE TO RELATED DOCUMENT

The present application claims the benefit of priority of Japanese Patent Application No. 2012-181994 filed on Aug. 21, 2012, the disclosure of which is incorporated herein by reference.

BACKGROUND

1. Technical Field

This disclosure relates generally to an electric rotating machine which is to be mounted in automotive vehicles such as passenger vehicles or trucks.

2. Background Art

Typical electric generator or alternators mounted in automotive vehicles work to supply charging power or operating power to a storage battery or various types of electric loads through a charging wire coupled to an output terminal thereof. Accidental removal of the output terminal or disconnection of a battery terminal from the battery during a power generating mode of the alternator will result in a surge of voltage called load dump. The peak of such surge may be as high as 100V or more depending upon the degree of output current from the alternator, which will be a factor resulting in damage to the electric loads or electric components of the alternator. It is, thus, necessary to take measures against such a voltage surge. For example, Japanese Patent First Publication No. 2012-16158, as assigned to the same assignee as that of this application, teaches an automotive alternator equipped with a load dump protector. Specifically, the alternator includes a bridge circuit whose low-side switching device is a MOS transistor and, when an output voltage from the alternator which has arisen from the load dump has exceeded a reference voltage, turns on the MOS transistor at a time when a voltage spike which arises from the turning on of the MOS transistor is expected not to be developed, thereby eliminating the risk of the voltage surge.

The disconnection of one of ends of the charging wire from the output terminal of the alternator or of the other end of the charging wire from the battery terminal are thought of as the cause for the load dump. When the charging wire is disconnected from the battery terminal, a rise in output voltage from the alternator which results from the load dump will be relatively small because of connection of other electric loads to the charging wire or impedance of the charging wire itself. The automotive alternator, as taught in the above publication, waits for an opportunity when the voltage spike will not occur and then turns on the MOS transistor, thereby avoiding application of the voltage spike to the electric loads connected to the charging wire.

Alternatively, when the charging wire is disconnected from the output terminal of the alternator, it will result in disconnection of all the electric loads from the alternator, thus leading to a great rise in output voltage from the alternator due to the load dump. Therefore, when the time when a voltage spike is expected not to occur is, like in the alternator taught in the above publication, waited for, it will result in an increased length of time for which an excessive voltage is appearing at the output terminal of the alternator. This may cause the voltage which exceeds the breakdown voltage to be applied to the MOS transistor or an electric power control circuit, so that it is damaged, thus resulting in a decrease in reliability in operation of the alternator.

SUMMARY

It is therefore an object to a structure of an electric rotating machine for automotive vehicles which is designed to quickly suppress the development of a voltage surge arising from the load dump and ensure the reliability in operation thereof.

According to one aspect of the invention, there is provided an electric rotating machine which may be used as an electric generator for a vehicle. The electric rotating machine comprises: (a) an armature winding which includes two or more phase windings; (b) a switching unit which works to rectify voltage induced in the armature winding, the switching unit being equipped with a bridge circuit which includes a switching device having a diode connected parallel thereto, the switching device serving as a lower arm switching device forming a lower arm of the bridge circuit; (c) a controller which works to turn on or off the lower arm switching device; (d) a capacitor connected parallel to an output of the switching unit; (e) a voltage change monitor which works to monitor an output voltage from the switching unit to determine a rate at which the output voltage changes; and (f) a load dump protector which works to selectively perform a first load dump protection operation and a second load dump protection operation to suppress development of a voltage surge arising from load dump. When the rate, as determined by the voltage change monitor, is smaller than a given value, the load dump protector commences the first load dump protection operation in light of a time when development of a voltage surge is expected to be suppressed, while when the rate, as determined by the voltage change monitor, is greater than the given value, the load dump protector initiates the second load dump protection operation regardless of the time when the voltage surge is expected to be suppressed.

For instance, when the load dump resulting from a disconnection of the electric rotating machine from a battery with an electric load kept joined to the electric rotating machine has occurred, and, particularly, the rate at which the level of the output voltage increases or decreases is less than the given value, it is possible to wait for starting the load dump protection until the time when occurrence of the voltage surge is effectively suppressed. In such an event, the load dump protector, therefore, commences the first load dump protection operation in light of the time when the voltage surge is expected to be suppressed, thereby minimizing adverse effects of the voltage surge on the electric load. Alternatively, when a disconnection of the output terminal of the electric rotating machine has occurred, the load dump will result in a quick rise in level of the output voltage. The load dump protector, thus, immediately initiates the second load dump protection operation without need for considering the time when the voltage surge is expected to be suppressed.

In the preferred mode of the embodiment, in a mode of the first load dump protection operation, the load dump protector monitors the output voltage from the switching unit and, when the output voltage has exceeded a first threshold value, issues an on-instruction to the controller to turn on the lower arm switching device at a time when the development of the voltage surge is expected to be eliminated. When, the output voltage has exceeded the first threshold value and then dropped below a second threshold value, the load dump protector issues an off-instruction to the controller to turn off the lower arm switching device at a time when the development of the voltage surge is expected to be eliminated.

Upon entry of a mode of the second load dump protection operation, the load dump protector monitors the output voltage from the switching unit and, when the output voltage has exceeded the first threshold value, issues an on-instruction to the controller to turn on the lower arm switching device. When, after exceeding the first threshold value, the output voltage has dropped below a second threshold value, the load dump protector issues the off-instruction to the controller to turn off the lower arm switching device.

In the mode of the second load dump protection operation, when the output voltage has dropped below the second threshold value, the load dump protector outputs the off-instruction to the controller for a first period of time to turn off the lower arm switching device and then outputs the off-instruction to the controller to turn on the lower arm switching device after an elapse of the first period of time.

When a period of time required for the output voltage from the switching unit to rise from the second threshold value to the first threshold value is more than or equal to a second period of time, the rate, as determined by the voltage change monitor, is determined to be smaller than the given value.

When a period of time required for the output voltage from the switching unit to drop from the first threshold value to the second threshold value is longer than or equal to a third period of time, the rate, as determined by the voltage change monitor, is determined to be smaller than the given value.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for the purpose of explanation and understanding only.

In the drawings.

DESCRIPTION OF THE PREFERRED EMBODIMENTS

Figure 1:
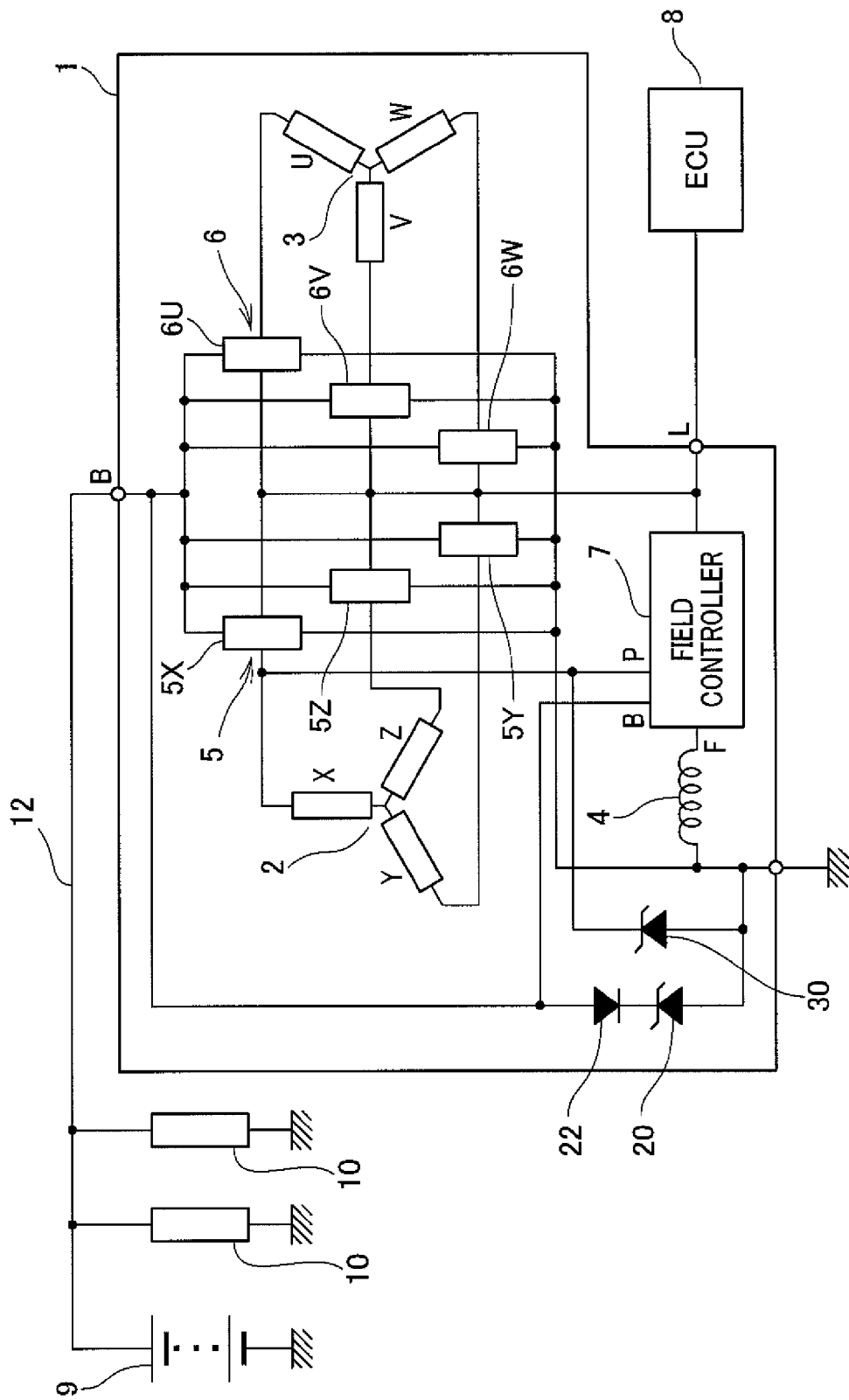
FIG. 1 is a circuit digraph of an electric rotating machine working as an alternator for automotive vehicles according to an embodiment.

Referring to the drawings, wherein like reference numbers refer to like parts in several views, particularly to FIG. 1, there is shown an electric rotating machine 1 according to the embodiment which is designed as an electric generator or alternator for automotive vehicles.

The alternator 1 is equipped with two stator windings (i.e., armature windings) 2 and 3, a field winding 4, two rectifier module groups 5 and 6, a field controller 7, Zener diodes 20 and 30, and a diode 22. Each of the rectifier module groups 5 and 6 works as a switching unit for one of the stator windings 2 and 3.

The stator winding 2 is a multi-phase winding made up of, for example, an X-phase winding, a Y-phase winding, and a Z-phase winding and wound around a stator core (not shown). Similarly, the stator winding 3 is a multi-phase winding made up of, for example, a U-phase winding, a V-phase winding, and a W-phase winding and wound around the stator core at an interval of 30° in electric angle away from the stator winding 2. The stator windings 2 and 3, and the stator core constitute the stator of the alternator 1.

The field winding 4 is wound around a field pole (not shown) disposed to face the inner periphery of the stator core and forms a rotor of the alternator 1. When a field current flows through the field winding 4, it will cause the field pole to be magnetized, thereby producing a revolving magnetic field, so that the ac voltage is developed at the stator windings 2 and 3.

The rectifier module group 5 is connected electrically to the stator winding 2 to form a three-phase full-wave rectifying circuit (bridge circuit) as a whole and works to convert the ac current, as induced in the stator winding 2, into the dc current. The rectifier module group 5 is made up of as many rectifier modules as the phases of the stator winding 2. In this embodiment, the rectifier module group 5 is made up of rectifier modules 5X, 5Y, and 5Z. The rectifier module 5X is connected to the X-phase winding of the stator winding 2. The rectifier module 5Y is connected to the Y-phase winding of the stator winding 2. Similarly, the rectifier module 5Z is connected to the Z-phase winding of the stator winding 2.

The rectifier module group 6 is connected electrically to the stator winding 3 to form a three-phase full-wave rectifying circuit (bridge circuit) as a whole and works to convert the ac current, as induced in the stator winding 3, into the dc current. The rectifier module group 6 is made up of as many rectifier modules as the phases of the stator winding 3. In this embodiment, the rectifier module group 6 is made up of rectifier modules 6U, 6V, and 6W. The rectifier module 6U is connected to the U-phase winding of the stator winding 3. The rectifier module 6V is connected to the V-phase winding of the stator winding 3. Similarly, the rectifier module 6W is connected to the W-phase winding of the stator winding 3.

The field controller 7 works to control an excitation current (also called magnetizing current) flowing through the field winding 4 connected thereto through an F-terminal as a function of an output voltage from the rectifier module groups 5 and 6 to bring an output voltage $V_B$ of the alternator 1 (i.e., an output voltage from each of the rectifier modules 5X, 5Y, and 5Z and the rectifier modules 6U, 6V, and 6W) into agreement with a regulated voltage Vreg (i.e., a target voltage). For instance, when the output voltage $V_B$ of the alternator 1 exceeds the regulated voltage Vreg, the field controller 7 stops supplying the excitation current to the field winding 4. Alternatively, when the output voltage $V_B$ of the alternator 1 drops below the regulated voltage Vreg, the field controller 7 resumes supplying the excitation current to the field winding 4 to increase the output voltage $V_B$ to agree with the regulated voltage Vreg. The field controller 7 also works as a rotation sensor to detect rotation of the rotor (i.e., the field winding 4) of the alternator 1 based on voltage (which will be referred to as a phase voltage), as developed at a preselected one of the phase windings (i.e., the X-phase winding in this embodiment) coupled to the P terminal. When finding that the rotor has stopped, the field controller 7 decreases the excitation current to be supplied to the field winding 4. Specifically, the field controller 7 sets the excitation current to be supplied to the field winding 4 to a value (e.g., around 2 A) creating the initial excitation of the alternator 1. The field controller 7 is also coupled through a communication terminal L and a communication line with an electronic control unit (ECU) 8 that is an external controller to establish a bidirectional serial communication (e.g., the so-called LIN (Local Interconnect Network) communication using the LIN protocol) between itself and the ECU 8 to transmit or receive messages to or from the ECU 8.

The Zener diode 20 is connected parallel to outputs of the rectifier module groups 5 and 6. Specifically, the Zener diode 20 is oriented to have a cathode leading to an output of the alternator 1 and an anode connected to ground. The diode 22 is connected in series with the Zener diode 20. The diode 22 works as a current control device to block a flow of electric current, as developed when the battery 9 is joined in error to the output of the alternator 1. Specifically, the diode 22 is connected at an anode thereof to the output of the alternator 1. The diode 22 is, as illustrated in FIG. 1, located closer to the output terminal of the alternator 1 than the Zener diode 20 is, but however, may alternatively be closer to the input of the alternator 1 than the Zener diode 20 is.

The Zener diode 30 is disposed between the P terminal of the field controller 7 and ground and coupled at a cathode thereof to the P terminal. In other words, the Zener diode 30 is connected parallel to a lower arm switching device (i.e., a low-side switching device) for a preselected one of the phase windings (i.e., the X-phase winding in this embodiment) coupled to the P terminal. The Zener diodes 20 and 30 are engineered to have a Zener voltage (i.e., breakdown voltage) lower than a breakdown voltage of the switching device or the field controller 7.

Figure 2:
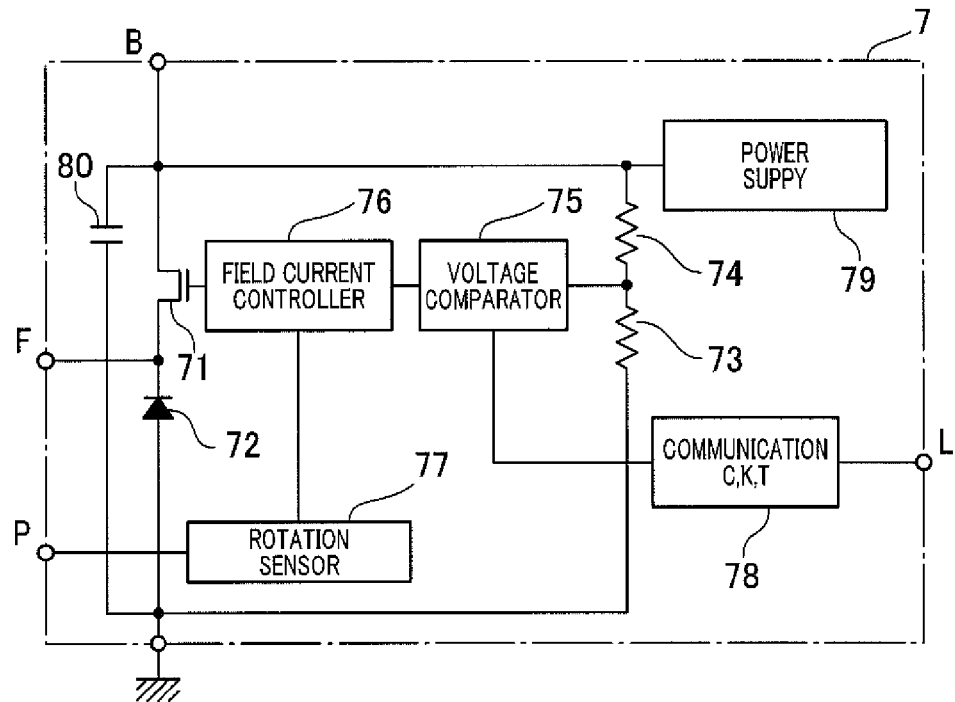
FIG. 2 is a circuit diagram which illustrates an internal structure of a field controller installed in the electric rotating machine of FIG. 1.

The field controller 7 is, as illustrated in FIG. 2, equipped with a MOS transistor 71, a flywheel diode 72, resistors 73 and 74, a voltage comparator 75, a field current controller 76, a rotation sensor 77, a communication circuit 78, a power supply circuit 79, and a capacitor 80. The communication circuit 78 works to establish serial communication between itself and the ECU 8 to receive data on the regulated voltage Vreg outputted from the ECU 8.

The resistors 73 and 74 constitute a voltage divider which serves to provide a fraction of voltage outputted from the alternator 1 (which will also be referred to below as generated voltage) to the voltage comparator 75. The voltage comparator 75 compares the fraction of the generated voltage, as inputted from the voltage divider, with a reference voltage corresponding to the regulated voltage Vreg, as received by the communication circuit 78. When the reference voltage is greater in level than the fraction of the generated voltage, the voltage comparator 75 outputs a high-level signal, while when the reference voltage is lower in level than the fraction of the generated voltage, the voltage comparator 75 outputs a low-level signal.

The field current controller 76 produces a PWM signal with duty cycle, as determined as a function of the output from the voltage comparator 75, to turn on or off the MOS transistor 71. The field current controller 76 may also be designed to change the field current gradually in order to minimize a rapid change in output current.

The rotation sensor 77 is coupled with the X-phase winding of the stator winding 2 through the P-terminal and works to detect rotation of the rotor using phase voltage Vp, as appearing at the end of the X-phase winding. Specifically, the rotation sensor 77 monitors a cyclic change in value of comparison between the phase voltage Vp and a given reference voltage to sense the rotation of the rotor. When the rectifier module 5X or the stator winding 2 is operating properly without undergoing a short-circuit, the phase voltage Vp of a given amplitude will appear on the P-terminal during the power generating mode of the alternator 1, thereby enabling the speed sensor 77 to use the phase voltage Vp to sense the rotation of the rotor.

The field current controller 76 receives the output from the rotation sensor 77 and outputs the PWM signal to supply the field current, as required in the power generating mode, to the field winding 4 when the rotor is determined to be rotating. Alternatively, when the rotor is determined to stop rotating for more than a given period of time (or more than a preselected number of cycles), that is, the rotation of the rotor has not been detected for the given period of time, the field current controller 76 outputs the PWM signal which produces the field current required to establish the initial excitation of the alternator 1.

The power supply circuit 79 works to supply operating voltage to each circuit component installed in the field controller 7. The capacitor 80 is connected parallel to the output terminals of the rectifier module groups 5 and 6 and serves to remove noise added to the output terminals of the rectifier module groups 5 and 6 and has a capacitance of, for example, 1 μF.

The structure and operation of the rectifier module 5X will be described below in detail with reference to FIG. 3. The other rectifier modules 5Y, 5Z, 6U, 6V, and 6W are identical in structure and operation with the rectifier module 5X, and explanation thereof in detail will be omitted here.

Figure 3:
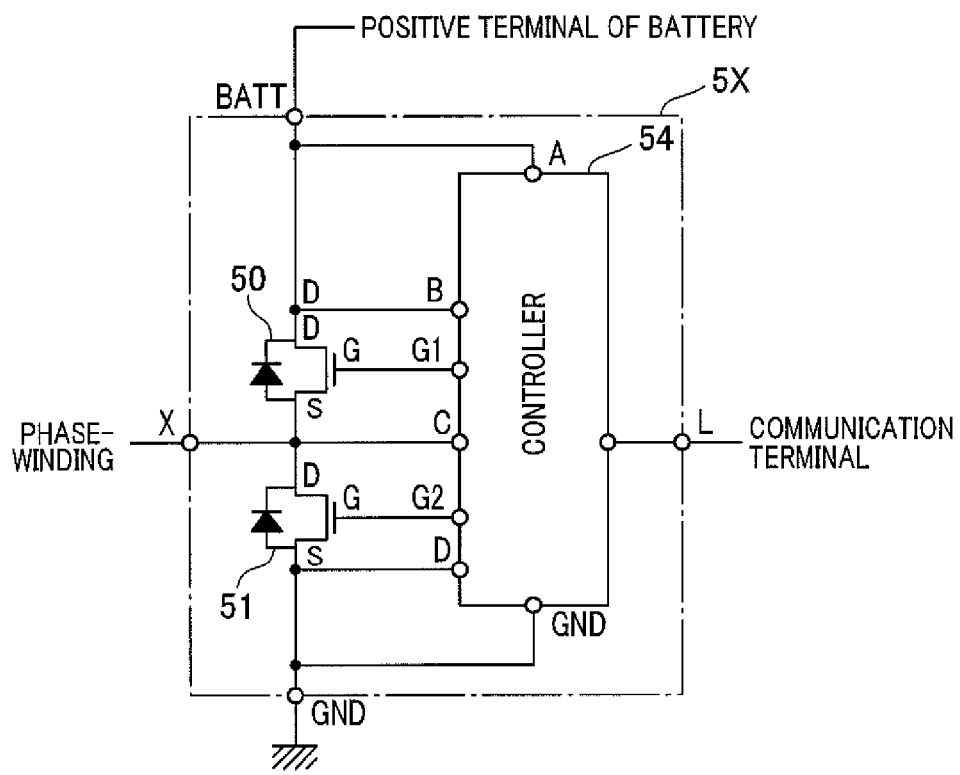
FIG. 3 is a circuit diagram which illustrates an internal structure of a rectifier module installed in the electric rotating machine of FIG. 1.

The rectifier module 5X, as illustrated in FIG. 3, consists of two MOS transistors 50 and 51 and a control circuit 54. The MOS transistor 50 works as a switching device of the upper arm (i.e., a high side arm) which is joined at a source thereof to the X-phase winding of the stator winding 2 and at a drain thereof to the electric loads 10 or the positive terminal of the battery 9 though the charging line 12. The MOS transistor 51 works as a switching device of the lower arm (i.e., a low side arm) which is joined at a drain thereof to the X-phase winding of the stator winding 2 and at a source thereof to a negative terminal (i.e., the earth) of the battery 9. Each of the MOS transistors 50 and 51 is, as clearly illustrated in FIG. 3, equipped with a diode disposed in parallel between the source and the drain thereof. The diode connected in parallel to the MOS transistors 51 and 51 is implemented by a parasitic diode (i.e., a body diode) thereof, but may alternatively be a separate diode. At least one of the MOS transistors 50 and 51 may be replaced with another type of switching device.

Figure 4:
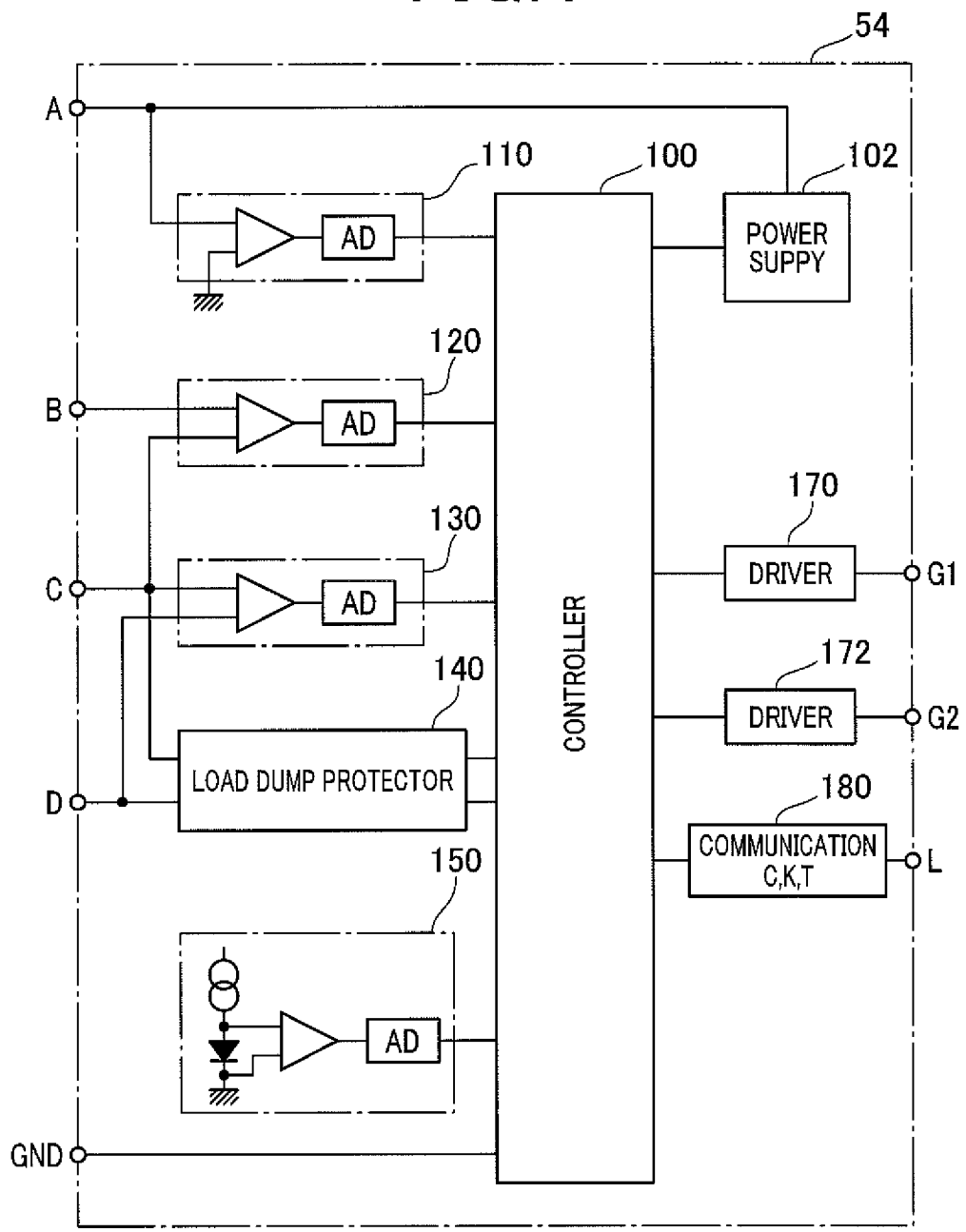
FIG. 4 is a circuit diagram which illustrates an internal structure of a control circuit installed in the rectifier module of FIG. 3.

The control circuit 54 is, as illustrated in FIG. 4, equipped with a controller 100, a power supply 102, a battery voltage detector 110, operation detectors 120 and 130, a load dump protector 140, a temperature detector 150, drivers 170 and 172, and a communication circuit 180.

The power supply 102 starts operating when a given voltage appears on the X-phase winding of the stator winding 2 upon start-up of the engine and supplies the operating voltage to each component devices installed in the control circuit 54. The operation of the power supply 102 is the same as that of the field controller 7 and achieved using known techniques.

The driver 170 is connected at an output terminal G1 thereof to the gate of the high-side MOS transistor 50 and works to produce a drive signal to turn on or off the MOS transistor 50. Similarly, the driver 172 is connected at an output terminal G2 thereof to the gate of the low-side MOS transistor 51 and works to produce a drive signal to turn on or off the MOS transistor 51.

The battery voltage detector 110 consists of a differential amplifier and an analog-to-digital (A/D) converter which converts an output from the differential amplifier into a digital form. The battery voltage detector 110 is connected to the positive terminal of the battery 9 through the output terminal of the alternator 1 and the charging line 12 and works to output data on the voltage appearing at the positive terminal of the battery 9.

The operation detector 120 consists of a differential amplifier and an analog-to-digital (A/D) converter which converts an output from the differential amplifier into a digital form. The operation detector 120 works to output data on the voltage developed between the source and drain of the high-side MOS transistor 50 (i.e., voltage appearing between terminals B and C in FIGS. 3 and 4). The controller 100 samples the data from the operation detector 120 to monitor the operating state of the MOS transistor 50 which corresponds to the operating state of the driver 170, thereby controlling or diagnosing the operation of the MOS transistor 50.

Similarly, the operation detector 130 consists of a differential amplifier and an analog-to-digital (A/D) converter which converts an output from the differential amplifier into a digital form. The operation detector 130 works to output data on the voltage developed between the source and drain of the low-side MOS transistor 51 (i.e., voltage appearing between terminals C and D in FIGS. 3 and 4). The controller 100 samples the data from the operation detector 130 to monitor the operating state of the MOS transistor 51 which corresponds to the operating state of the driver 171, thereby controlling or diagnosing the operation of the MOS transistor 51.

The load dump protector 140 monitors the output voltage of the alternator 1, that is, the voltage outputted by the rectifier module groups 5 and 6 (i.e., the voltage at the B-terminal) and issues an instruction for a load dump protection operation when the voltage at the B-terminal has exceeded a first threshold level V1 (e.g., 20V) which indicates the occurrence of the load dump. Subsequently, when the voltage at the B-terminal has been decreased by the load dump protection operation below a second threshold level V2 (e.g., 16.5V) which is lower than the first threshold level V1, the load dump protector 140 issues an instruction to stop the load dump protection operation. The controller 100 commences the load dump protection operation or the rectifying operation after the load dump protection operation is started or stopped by the load dump protector 140. The structure of the load dump protector 140 and the load dump protection operation will be described later in detail.

The temperature detector 150 is made up of a constant current source, a diode, a differential amplifier, and an analog-to-digital (A/D) converter which converts an output from the differential amplifier into a digital form. The temperature detector 150 works to output data on a forward voltage drop at the diode that is a function of the temperature thereof. The controller 100 samples the data outputted from the temperature detector 150 to calculate the temperature of the rectifier module 5X.

The communication circuit 180 is identical in operation with the communication circuit 78 of the field controller 7. Specifically, the communication circuit 180 is coupled with a communication terminal and a communication line which connect between the field controller 7 and the ECU 8 and establishes a bidirectional serial communication (e.g., the so-called LIN (Local Interconnect Network) communication using the LIN protocol) between itself and the ECU 8 to transmit or receive messages to or from the ECU 8.

The load dump protection operation and an operation to return the load dump protection operation to a normal rectifying operation will be described below in detail. These operations are the same among the rectifier modules 5X, 5Y, 5Z, 6U, 6V, and 6W. The following discussion will, therefore, refer only to the rectifier module 5X for the convenience of disclosure.

The cause for the load dump is usually thought of as being either of two types: removal of the charging line 12 from the positive terminal of the battery 9 or disconnection of the large electric loads 10 from the battery 9 (which will also be referred to as a battery terminal disconnection) and removal of the charging line 12 from the output terminal of the alternator 1 (which will also be referred to as an output terminal disconnection). In the event of the former case (which will also be referred to as cause type 1), it is necessary to avoid development of a surge voltage which arises from the load dump protection operation because the electric loads 10 are still connected to the charging line 12. In the event of the latter case (which will also be referred to as cause type 2) where the charging line 12 is disconnected from the alternator 1, there is no need to consider adverse effects of surge voltage on the electric loads 10, but however, it is necessary to take measures against a rapid rise in output voltage from the alternator 1. The alternator 1 is, therefore, designed to discriminate between the cause types 1 and 2 and then selectively perform a first load dump protection operation against the cause type 1 and a second load dump protection operation against the cause type 2.

Figure 5:
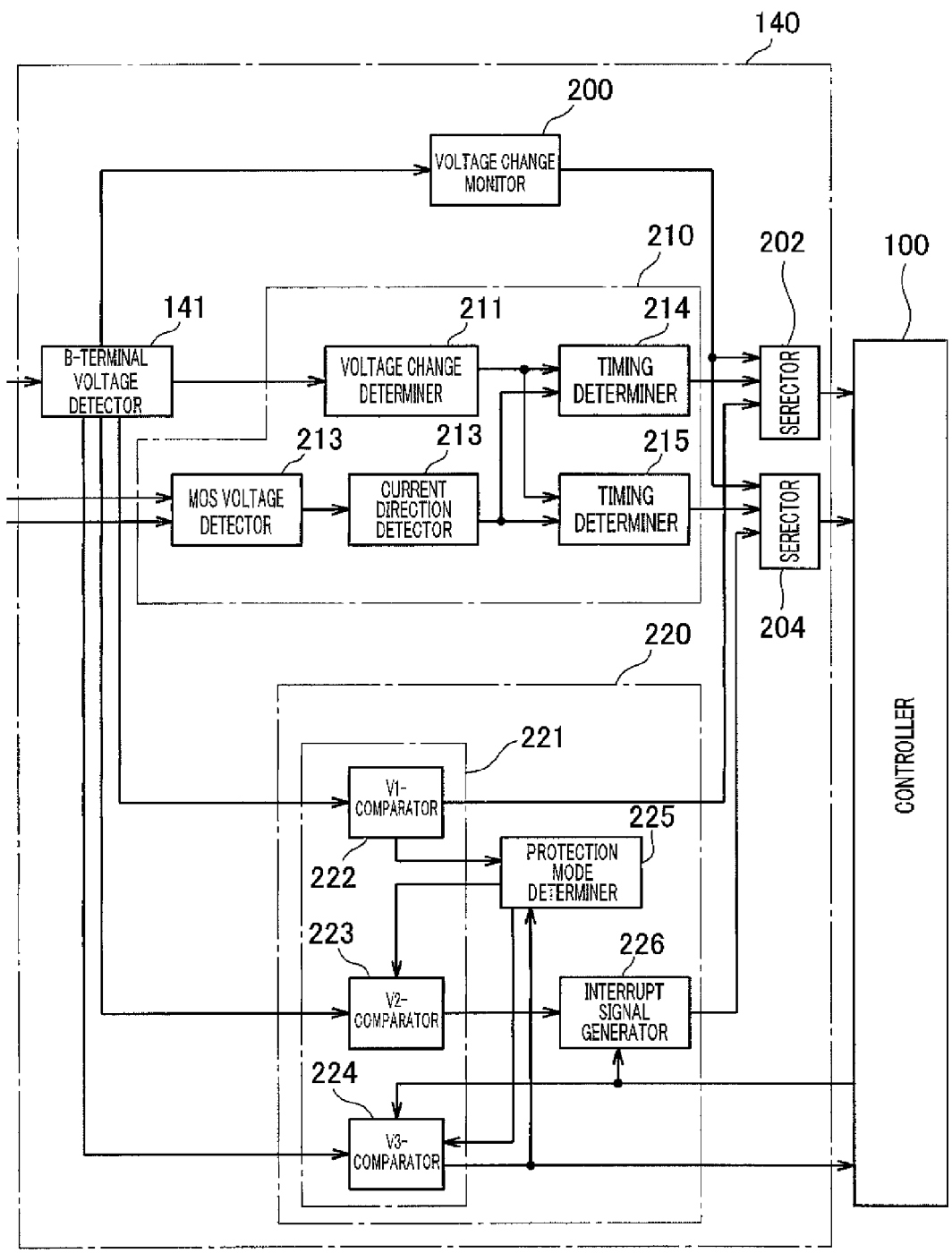
FIG. 5 is a circuit diagram which illustrates an internal structure of a load dump protector installed in the control circuit of FIG. 4.

The load dump protector 140 is, as illustrated in FIG. 5, equipped with a B-terminal voltage detector 141, a voltage change monitor 200, selectors 202 and 204, a first protection circuit 210, and a second protection circuit 220.

The B-terminal voltage detector 141 works to measure the output voltage VB (i.e., voltage developed at the B-terminal) from the alternator 1 (i.e., the rectifier module groups 5 and 6). The voltage change monitor 200 works to monitor the output voltage VB, as measured by the B-terminal voltage detector 141, to determine a rate of change in the output voltage VB (i.e., a rate of increase or decrease in the output voltage VB). The voltage change monitor 200 also works to determine whether the rate of change in the output voltage VB is smaller than a given value or not. When the rate of change in the output voltage VB is determined to be smaller than the given value, the voltage change monitor 200 activates the first protection circuit 210. Alternatively, when the rate of change in the output voltage VB is determined to be greater than the given value, that is, not smaller than the given value, the voltage change monitor 200 activates the second protection circuit 220. Specifically, the voltage change monitor 200 turns on one of the selectors 202 and 204 to transmit the output from a corresponding one of the first and second protection circuits 210 and 220 to the controller 100.

Figure 6:
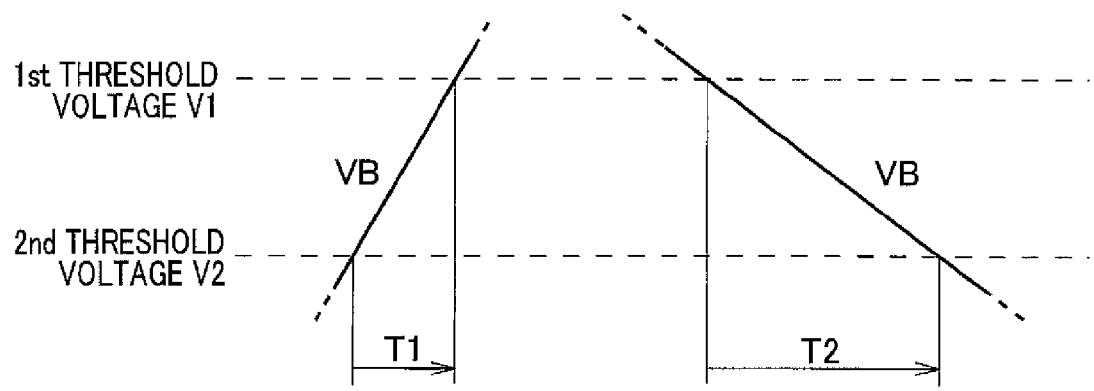
FIG. 6 is a view which shows a relation between threshold values and a change in output voltage from the electric rotating machine of FIG. 1.

The determination made by the voltage change monitor 200 of whether the rate of change in the output voltage VB is smaller than the given value or not is achieved by measuring a time T1 (see FIG. 6) required by the output voltage VB to increase from a second threshold voltage V2 to a first threshold voltage V1 and determining whether the time T1 is longer than or equal to a given time length (which will also be referred to as a second period of time) or not or by measuring a time T2 (see FIG. 6) required by the output voltage VB to decrease from the first threshold voltage V1 to the second threshold voltage V2 and determining whether the time T2 is longer than or equal to a given time length (which will also be referred to as a third period of time) or not. When either of the times T1 and T2 is determined to be greater than a corresponding one of the given time lengths, it means that the rate of change in the output voltage VB is less than the given value.

The first protection circuit 210 works to perform the first load dump protection operation against the cause type 1 (i.e., the battery terminal disconnection). The first protection circuit 210 consists of a voltage change determiner 211, a MOS voltage detector 212, an energization current direction detector 213, and timing determiners 214 and 215.

Figure 7:
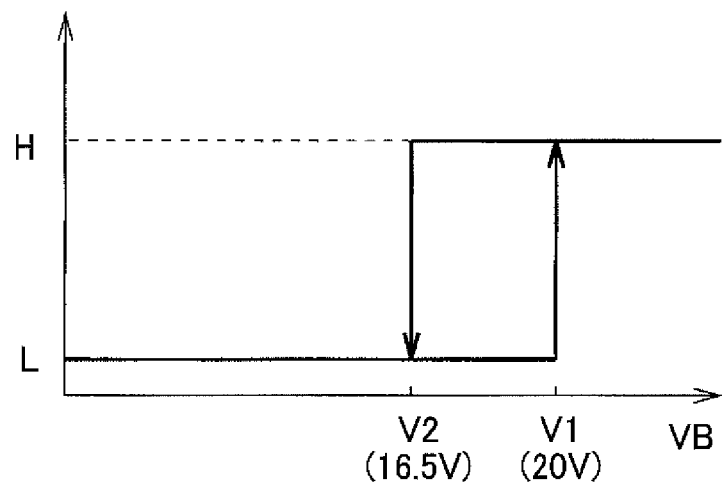
FIG. 7 is a view which demonstrates a relation between an output voltage from the electric rotating machine of FIG. 1 and a result of determination made by a voltage change determiner installed in the load dump protector of FIG. 5.

The voltage change determiner 211 works as an output voltage-threshold comparator to determine whether the output voltage VB has risen above the first threshold voltage V1 or not or whether the output voltage VB has dropped below the second threshold voltage V2 after exceeding the first threshold voltage V1 or not. FIG. 7 demonstrates a relation between the output voltage VB and a result of determination made by the voltage change determiner 211. The horizontal axis indicates the output voltage VB. The vertical axis indicates the result of determination made by the voltage change determiner 211. Specifically, when the output voltage VB has exceeded 20V (i.e., the first threshold voltage V1), the voltage change determiner 211 changes an output therefrom from a low level (L) to a high level (H). When the output voltage VB has exceeded 20V and then dropped below 16.5V (i.e., the second threshold voltage V2), the voltage change determiner 211 changes the output therefrom from the high level (H) to the low level (L).

The MOS voltage detector 212 works to measure a voltage Vds developed between the source and drain of the low-side MOS transistor 51 (i.e., the terminal C-D voltage in FIGS. 3 and 4). The energization current direction detector 213 works to analyze the source-drain voltage Vds, as derived by the MOS voltage detector 212, to determine the direction of electric current flowing between the source and drain of the MOS transistor 51 when being turned on.

Figure 8A:
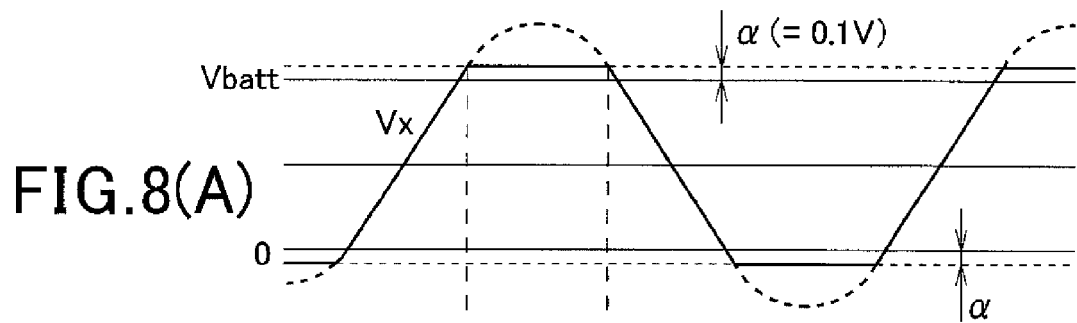
FIG. 8(A) is an illustration which represents a change in terminal voltage developed at a battery.

In the following discussion, the terminal voltage developed at the battery 9 is expressed by Vbatt, and the voltage developed between the source and the drain of the MOS transistor 50 or 51 when turned on is expressed by a. When the load dump is not occurring, and, for example, the phase voltage Vx at the X-phase winding of the stator winding 2 exceeds Vbatt plus a, the control circuit 54 turns on the high-side MOS transistor 50, while when the load dump is not occurring, and the phase voltage Vx at the X-phase winding of the stator winding 2 drops below −a, the control circuit 54 turns on the low-side MOS transistor 51, thereby performing synchronous rectification (see FIG. 8(A)).

Figure 8B:
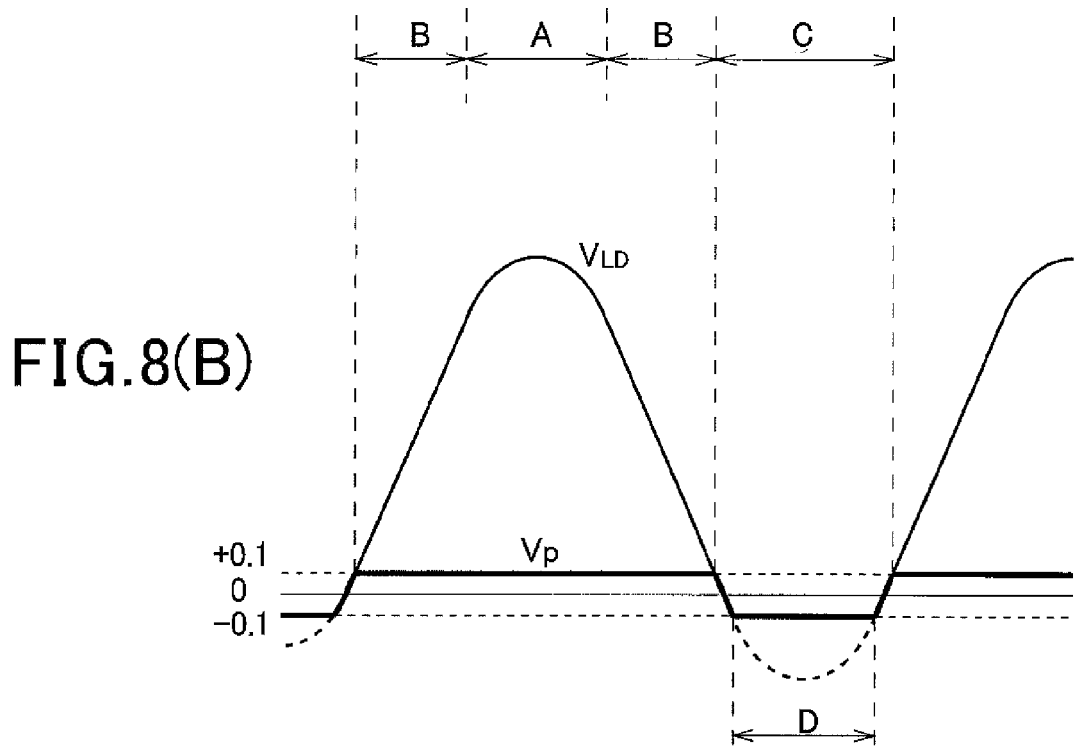
FIG. 8(B) is an illustration which demonstrates a change in voltage, as developed at a phase winding of a stator, in the event of load dump arising from disconnection of an output terminal of the electric rotating machine of FIG. 1.

In the event of the battery terminal disconnection or the output terminal disconnection in the synchronous rectifying operation, the load dump, as described above, will occur which results in a surge in voltage at each of the phase windings of the stator windings 2 and 3 of the alternator 1 (see FIG. 8(B)). This may cause, as demonstrated in FIG. 8(B), the phase voltage $V_{LD}$ (e.g., the phase voltage Vx) to rise over the terminal voltage Vbatt of the battery 9 up to, for example, 100V or more. In such an event, the rectifier module 5X commences a pre-load dump protection operation and then executes the load dump protection operation in order to protect the rectifier module 5X, etc. in the alternator 1, the field controller 7, or the electric loads 10 (see FIG. 9).

Figure 9:
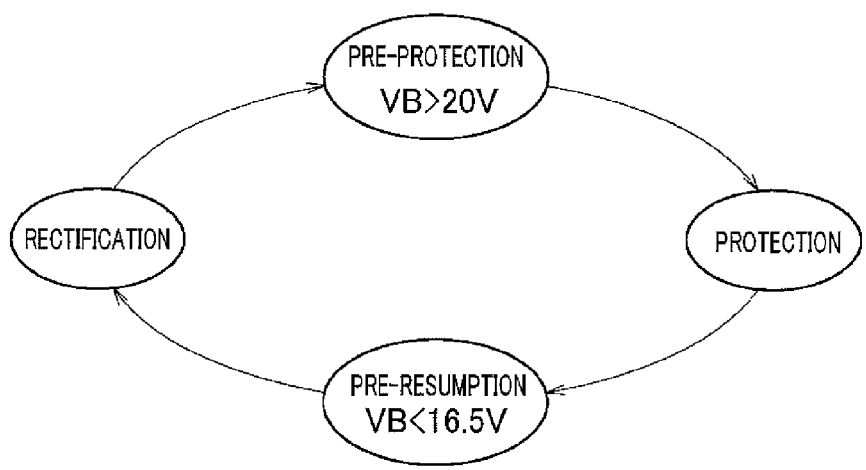
FIG. 9 is an illustration which represents a sequence of operations of the electric rotating machine of FIG. 1 to achieve rectification and load dump protection.

In FIG. 9, "rectification" indicates a rectification mode that is one of a sequence of operation modes of the alternator 1 in the absence of the load dump arising from the battery terminal disconnection. When the battery terminal disconnection is taken place during the rectifying operation mode, so that the phase voltage Vx exceeds 20V (in the case where the battery 9 is made of a lead-acid storage battery whose rated voltage is 12V), the alternator 1 enters a pre-load dump protection mode to initiate the pre-load dump protection operation. The pre-load dump protection operation is to set an optimum time when a load dump protection mode should be commenced. Specifically, the load dump protector 140 issues a load dump protection start instruction to the controller 100 at a time when the occurrence of a voltage spike or surge will be suppressed upon entry of the load dump protection mode.

For example, when the phase voltage Vx exceeds 20V in the event of the load dump, the control circuit 54 turns on the low-side MOS transistor 51 and simultaneously turns off the high-side MOS transistor 50 to execute the load dump protection operation. The control circuit 54 keeps the MOS transistors 51 and 50 in such an on- and off-state, respectively, until the voltage surge arising from the load dump disappears. This, as demonstrated in FIG. 8(B), limits the phase voltage $V_{LD}$ (i.e., the phase voltage Vx) to voltage $V_P$ within a range of −a to +a during the load dump protection mode.

Before the load dump protection mode is entered, the high-side MOS transistor 50 is placed in the on-state, while the low-side MOS transistor 51 is placed in the off-state. Instantaneous switching of the MOS transistors 50 and 51 from the on-state to the off-state and from the off-state to the on-state, respectively, upon entry of the load dump protection mode may, therefore, result in a large voltage spike or surge at the X-phase winding in a period of time A in FIG. 8(B). Specifically, each of the MOS transistors 50 and 51 actually has an individual variability in time when it is switched completely between the on- and off-state. If, therefore, only the time when the high-side MOS transistor 50 starts to be turned off is advanced slightly, it will result in instantaneous cut of electric current flowing through the X-phase winding, which leads to development of a large voltage surge.

In each period of time B in FIG. 8(B), no current is flowing through the X-phase winding, but a potential difference between the source and the drain of the low-side MOS transistor 51 is great, thus causing a large current to be created in the X-phase winding at the instant of turning on of the MOS transistor 51. Such a great change in flow of current in the X-phase winding will result in a large voltage spike or surge at the X-phase winding.

As apparent from the above discussion, the entry of the load dump protection mode either in the period of time A or B encounters the above probability of a voltage surge in the alternator 1. In order to avoid this problem, the rectifier module 5X (i.e., the controller 100) is engineered to commence the load dump protection operation when a period of time C in FIG. 8(B) is found to have been entered. The pre-load dump protection operation determines that when the period of time C is entered, the optimum time for initiating the load dump protection operation has been reached.

Similarly, when it is required to resume the rectifying operation after the voltage surge arising from the load dump due to the battery terminal disconnection is avoided by the load dump protection operation, the rectifier module 5X (i.e., the control circuit 54) performs a pre-resumption operation (see FIG. 9). Specifically, the rectifier module 5X enters a pre-resumption mode to initiate the pre-resumption operation when the phase voltage Vx which has been elevated due to the load dump is decreased below 16.5V. The pre-resumption operation is to set an optimum time when the rectifying operation should be resumed. Specifically, the load dump protector 140 issues a rectification resuming instruction to the controller 100 at a time when a voltage surge arising from resumption of the rectifying operation mode (i.e., switching of the MOS transistors 50 and 51) will be avoided. The controller 100 is responsive to the rectification resuming instruction to turn off the low-side MOS transistor 51 and then initiate the rectifying operation (i.e., the synchronous rectification), as described above.

During the load dump protection operation, the low-side MOS transistor 51 is kept on, so that the phase voltage Vp in FIG. 8(B) is developed at the X-phase winding. Therefore, when the low-side MOS transistor 51 is turned off within a period of time from B to A, and to B in FIG. 8(B), a large scale current which has been flowing in the X-phase winding through the MOS transistor 51 will be cut, thus resulting in development of a large voltage surge. In order to avoid such a voltage surge, the rectifier module 5X (i.e., the control circuit 54) is engineered to, like in the pre-load dump protection mode, commence the normal rectifying operation when the period of time C in FIG. 8(B) is determined to have been entered. The pre-resumption operation determines that when the period of time C is entered, the optimum time for resuming the rectifying operation has been reached.

When the load dump is occurring before entry of the load dump protection mode, that is, before the low-side MOS transistor 51 is turned on, the phase voltage $V_{LD}$, as developed in the period of time from B to A, and to B in FIG. 8(B), is kept above 0V. The determination of whether the period of time C has been entered or not, that is, whether, when the MOS transistor 51 is turned on, the current will flow therethrough in a direction opposite the forward direction in which the current is permitted to pass through the diode connected in parallel to the MOS transistor 51 or not is, thus, achieved by checking whether the phase voltage $V_{LD}$, that is, the voltage Vds between the source and the drain of the MOS transistor 51 has dropped below a reference voltage Vref that is lower than 0V or not. When the source-to-drain voltage Vds is lower than the reference voltage Vref, it means that the level of the phase voltage $V_{LD}$ is lying in a range indicating that the period of time C, as illustrated in FIG. 8(B), has commenced. In such a condition, the energization current direction detector 213 produces an output of a high level.

Actually, it is difficult for the MOS voltage detector 212 to accurately measure the voltage in a range of −0.1V to +0.1V and also for the energization current direction detector 213 to accurately compare the output from the MOS voltage detector 212 with the reference voltage Vref set near 0V. Consequently, the MOS voltage detector 212 is designed to amplify the level of the source-to-drain voltage Vds with a given gain to produce a voltage Vds'. The energization current direction detector 213 works to compare the voltage Vds' with a given reference voltage to make the determination of whether the source-to-drain voltage Vds is lower than the reference voltage Vref or not.

Figure 10:
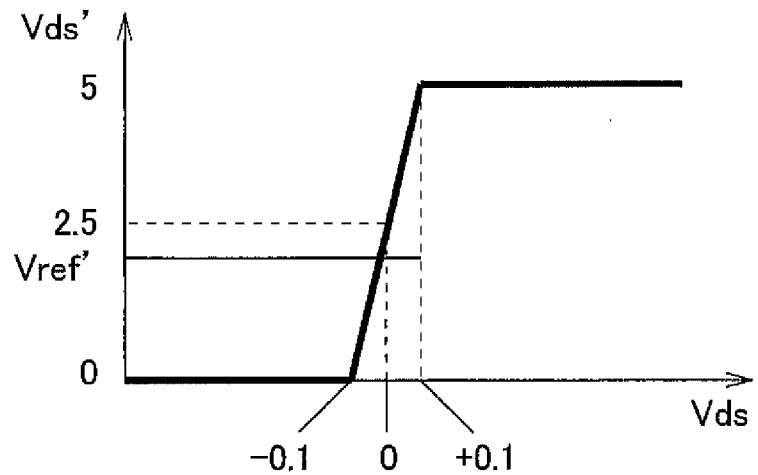
FIG. 10 is a graph which represents a relation between a source-to-drain voltage and voltage, as amplified by a MOS voltage detector installed in the load dump protector of FIG. 5.

FIG. 10 is a graph which represents a relation between the source-to-drain voltage Vds and the voltage Vds', as amplified by the MOS voltage detector 212. The vertical axis indicates the voltage Vds'. The horizontal axis indicates the source-to-drain voltage Vds. A range in which the source-to-drain voltage Vds is to be compared with the reference voltage Vref is, as can be seen in FIG. 8(B), between −0.1V and +0.1V. The MOS voltage detector 212 amplifies the level of the source-to-drain voltage Vds by a factor of, for example, 20. In the example of FIG. 10, −0.1V is converted into 0V, and +0.1 is converted into +5V. The level of the voltage Vds' changes linearly in a range of 0V to +5V. In other words, the level of the voltage Vds', as can be seen in FIG. 10, corresponds linearly to the level of the source-to-drain voltage Vds. When the source-to-drain voltage Vds has dropped below −0.1V, the output from the MOS voltage detector 212 is clipped to 0V, while when the source-to-drain voltage Vds has exceeded +0.1V, the output from the MOS voltage detector 212 is clipped to 5V. An accurate determination of whether the period of time C, as illustrated in FIG. 8(B), has been entered or not requires the reference voltage Vref' to be set near +5V.

The energization current direction detector 213 compares the voltage Vds', as outputted from the MOS voltage detector 212, with the reference voltage Vref' and outputs a high level signal when the voltage Vds' is lower than the reference voltage Vref', while it outputs a low level signal when the voltage Vds' is higher than the reference voltage Vref'.

The timing determiner 214 works to output a high level signal when the output from the energization current direction detector 213 has changed to the high level after the output from the voltage change determiner 211 has changed from the low level to the high level, that is, when the output voltage VB has exceeded 20V in the presence of the load dump, and the period of time C, as illustrated in FIG. 8(B), is determined to have commenced. The high level signal, as outputted from the timing determiner 214, carries the load dump protection start instruction, as described above. The controller 100 controls the driver 170 to turn off the high-side MOS transistor 50 and also controls the driver 172 to turn on the low-side MOS transistor 51 to initiate the load dump protection operation.

The timing determiner 215 works to output a high level signal when the output from the energization current direction detector 213 has changed to the high level after the output from the voltage change determiner 211 has changed from the high level to the low level, that is, when the output voltage VB which has exceeded 20V in the presence of the load dump and then dropped below 16.5V, and the period of time C, as illustrated in FIG. 8(B), is determined to have started. The high level signal, as outputted from the timing determiner 214, carries the rectification resuming instruction, as described above. The controller 100 controls the driver 172 to turn off the low-side MOS transistor 51 and then resumes the synchronous rectifying operation.

The second protection circuit 220 works to perform the second load dump protection operation against the cause type 2 (i.e., the output terminal disconnection). The second protection circuit 220, as illustrated in FIG. 5, consists of a voltage change determiner 221, a protection mode determiner 225, and an interrupt signal generator 226.

The voltage change determiner 221 works as an output voltage-threshold comparator to compare the level of the output voltage VB, as measured by the B-terminal voltage detector 141, with each of three threshold values V1, V2, and V3. Specifically, the voltage change determiner 221 is equipped with a V1-comparator 222, a V2-comparator 223, and a V3-comparator 224.

The V1-comparator 222 compares the output voltage VB with the first threshold value V1 (e.g., 20V) and outputs, for example, a high level signal when the output voltage VB is greater than the first threshold value V1. The output from the V1-comparator 222 is transmitted to the controller 100 through the selector 202. When the output from the V1-comparator 222 has changed from the low level to the high level, indicating the occurrence of the load dump, the controller 100 controls the driver 170 to turn off the high-side MOS transistor 50 and also controls the driver 172 to turn on the low-side MOS transistor 51 to initiate the load dump protection operation for decreasing the output voltage VB which has exceeded the first threshold value V1.

The V2-comparator 223 compares the output voltage VB with the second threshold value V2 and outputs, for example, a high level signal when the output voltage VB is lower than the second threshold value V2. The second threshold value V2 indicates the fact that the load dump protection operation has been initiated, so that the output voltage VB has dropped and is set to, for example, 16.5V which is lower than the first threshold value V1 (e.g., 20V).

The output from the V2-comparator 223 is transmitted to the interrupt signal generator 226. Specifically, when the output from the V2-comparator 223 has changed from the low level to the high level, which indicates that the output voltage VB has dropped below the second threshold value V2, the interrupt signal generator 226 works to output a high-level pulse signal for a given period of time (which will also be referred to as a first period of time). The output from the interrupt signal generator 226 is transmitted to the controller 100 through the selector 204. The controller 100 is responsive to the high-level signal from the interrupt signal generator 226 to interrupt the load dump protection operation for a period of time corresponding to the first period of time. Specifically, the controller 100 actuates the driver 172 for the given period of time to turn off the low-side MOS transistor 51 while keeping the high-side MOS transistor 50 off. After the elapse of the given period of time, the controller 100 actuates the driver 172 again to turn on the low-side MOS transistor 51. How to determine the given period of time (i.e., the first period of time) in which the output from the interrupt signal generator 226 is kept at the high level will be described later in detail.

The V3-comparator 224 compares the output voltage VB with the third threshold value V3 and outputs, for example, a high level signal when the output voltage VB is lower than the third threshold value V3. The third threshold value V3 is for detecting the time when the load dump protection operation has been terminated.

The V3-comparator 224 uses the output voltage VB, as produced immediately after the MOS transistor 51 is kept off for a given period of time in response to the pulse signal outputted from the interrupt signal generator 226, to compare it with the third threshold value V3. The controller 100 outputs a time signal immediately after the MOS transistor continues to be turned off for the given period of time. The V3-comparator 224 is responsive to the time signal to commence the comparison of the output voltage VB with the third threshold value V3.

The protection mode determiner 225 works to determine whether the load dump protection operation, as prepared against the cause type 2 (i.e., the output terminal disconnection), is being performed or not. Specifically, the protection mode determiner 225 makes a determination of whether the output from the V1-comparator 221 has changed to initiate the load dump protection operation or not. When the output from the V1-comparator 221 has changed to the high level, the protection mode determiner 225 decides that the load dump protection operation has started and output a signal indicating such a fact to the V3-comparator 224. Subsequently, when the output from the V3-comparator 224 has changed to the high level, the protection mode determiner 225 determines that the load dump protection operation has been terminated. The third threshold value V3 is set lower than the first threshold value V1, but higher than the second threshold value V2. The third threshold value V3 may alternatively be selected to be equal to the second threshold value V2. This permits a single circuit structure to be shared between the V2-comparator 223 and the V3-comparator 224.

Figure 11:
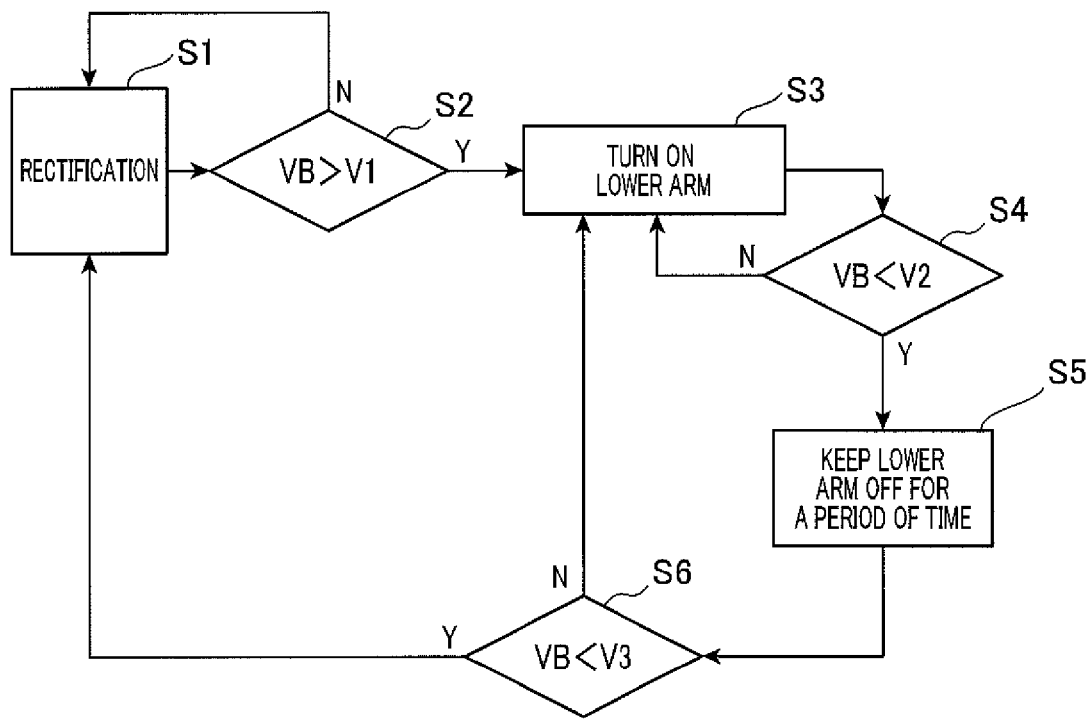
FIG. 11 is an illustration which represents a sequence of operations of the electric rotating machine of FIG. 1 in the event of load dump arising from disconnection of an output terminal of the electric rotating machine.

FIG. 11 illustrates a sequence of operations of the alternator 1 (i.e., the control circuit 54). Step S1 indicates the rectifying operation performed in the absence of the load dump. When the load dump is not occurring, and, for example, the phase voltage Vx at the X-phase winding of the stator winding 2 exceeds the sum of the terminal voltage Vbatt at the battery 9 and the voltage a developed between the source and the drain of the MOS transistor 50 or 51 when turned on, the control circuit 54 turns on the high-side MOS transistor 50, while when the load dump is not occurring, and the phase voltage Vx at the X-phase winding of the stator winding 2 drops below −a (i.e., a minus of the source-to-drain voltage a), the control circuit 54 turns on the low-side MOS transistor 51, thereby performing the synchronous rectification (see FIG. 8(A) and step S1 in FIG. 11) to adjust the output voltage VB to the target voltage Vreg (e.g., 14.5V). In parallel to such a rectification operation, the V1-comparator 222 compares the output voltage VB with the first threshold value V1 (see step S2 in FIG. 11). If the charging line 12 is disconnected from the output terminal of the alternator 1, the load dump, as described above, will occur, which results in a voltage surge at each phase winding of the stator windings 2 and 3 of the alternator 1. This causes the output voltage 1/B to rise over the first threshold value V1. The V1-comparator 222, thus, outputs the high-level signal indicating the start of the load dump protection operation to the controller 100. The controller 100 then activates the driver 170 to turn off the high-side (upper arm) MOS transistor 50 and also activates the driver 172 to turn on the low-side (lower arm) MOS transistor 51 (see step S3 in FIG. 11).

There is always a time lag between a change in output from the V1-comparator 222 to the high level and when the controller 100 starts to actuate the driver 172 to turn on the MOS transistor 51. Such a time lag is expressed by Tr in FIG. 12. Specifically, after the elapse of the time lag Tr following the change in output from the V1-comparator 222 to the high level, the controller 100 turns off the MOS transistor 50 and turns on the MOS transistor 51. The output voltage VB continues to rise until the MOS transistor 51 is turned on. However, when the output voltage VB reaches the Zener voltage of the Zener diode 20 connected to the output terminal of the alternator 1, or more accurately when the output voltage VB minus the forward voltage of the diode 22 reaches the Zener voltage of the Zener diode 10, the output voltage VB is kept at the Zener voltage. This is indicated by "ON" on a line representing an operation of the Zener diode 20.

After the lower arm MOS transistor 51 is turned on, the output voltage VB drops. The V2-comparator 223 determines whether the output voltage VB had dropped below the second threshold value V2 or not (see step S4 in FIG. 11). When the output voltage VB has dropped below the second threshold value V2, the V2-comparator 223 outputs a signal indicating such a fact to the interrupt signal generator 226. The interrupt signal generator 226 continues to output the high-level pulse signal to the controller 100 for a predetermined period of time (i.e., the first period of time). The controller 100 actuates the driver 172 to turn off the low-side MOS transistor 51 for a period of time, as given as a function of the predetermined period of time (i.e., the first period of time). After the elapse of the predetermined period of time, the controller 100 actuates the driver 172 again to turn on the low-side MOS transistor 51 (see step S5 in FIG. 11).

There is a time lag between output of the pulse signal from the interrupt signal generator 226 and when the controller 100 starts to actuate the driver 172 to turn off the MOS transistor 51. Such a time lag is expressed by Tr in FIG. 12 and substantially identical with the time lag, as described above, between a change in output from the V1-comparator 222 to the high level and when the controller 100 starts to actuate the driver 172 to turn on the MOS transistor 51 to initiate the load dump protection operation, but however it may be different therefrom. The period of time for which the MOS transistor 51 is kept off is expressed by T0 in FIG. 21. The V3-comparator 224 samples the output voltage VB immediately after the MOS transistor 51 is kept off for the period of time T0 and compares it with the third threshold value V3 (see step S6 in FIG. 11).

Until energy stored in the stator of the alternator 1 in the event of the load dump disappears, turning off the lower arm MOS transistor 51 in a condition where the upper arm MOS transistor 50 is kept off causes the current to flow through the diode connected parallel to the MOS transistor 50, so that the output voltage VB starts to rise again. The output voltage VB immediately after the MOS transistor 51 is turned off for the period of time T0, thus, exceeds the third threshold value V3, so that the load dump protection operation continues. The disappearance of energy stored in the stator in the event of the load dump causes the output voltage VB immediately after the MOS transistor 51 is turned off for the period of time T0 to drop below the third threshold value V3. The controller 100, therefore, stops the load dump protection operation and then resumes the synchronous rectifying operation.

How to determine the period of time in which the lower arm MOS transistor 51 is kept off in the load dump protection mode will be described below. In the load dump protection operation in the event of the output terminal disconnection, the level of the output voltage VB, as sampled immediately after the lower arm MOS transistor 51 is turned off for a given period of time, is used to determine a period of time (which will also be referred to as an off-duration below) for which the MOS transistor 51 should be turned off on a subsequent off-request, in other words, when the output voltage VB drops below the second threshold value V2 subsequently. In other words, the off-duration for which the lower arm MOS transistor 51 is kept off is determined as a function of a rate at which the output voltage VB has risen in the event of the load dump. A minimum value of the off-duration is set shorter than the time lag Tr, thereby enabling the MOS transistor 51 to be turned on quickly as compared with when the output voltage VB is detected to turn on the MOS transistor 51 again. This avoids an undesirable rise in the output voltage VB due to a delay in turning on the MOS transistor 51. More specifically, the off-duration is determined in any of three methods, as described below.

First Method

Figure 12:
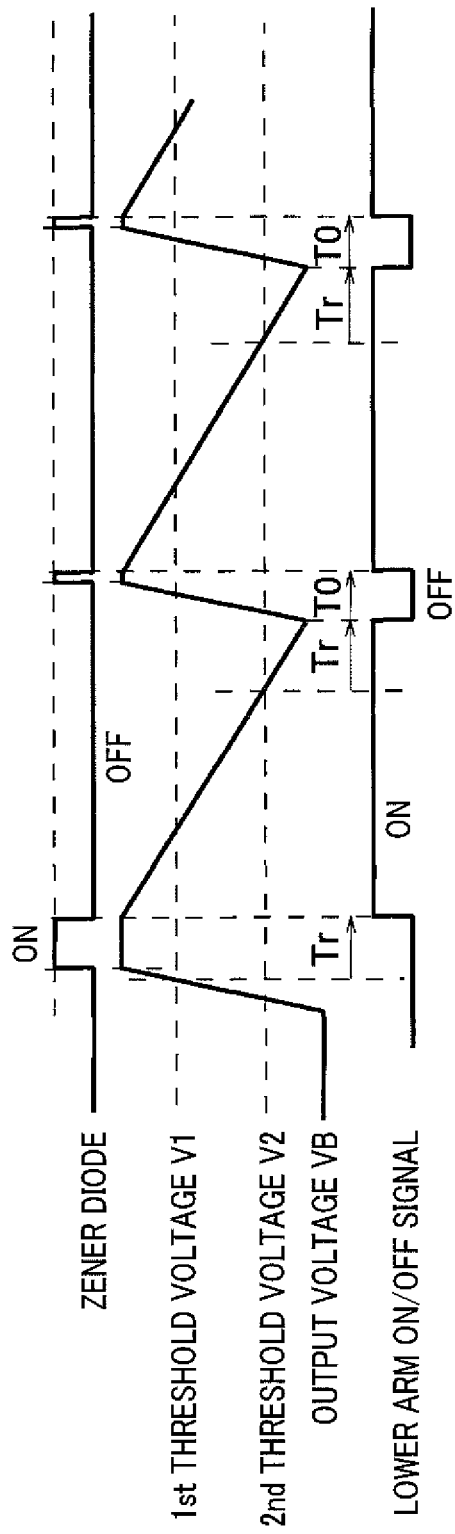
FIG. 12 is a time chart of a load dump protection operation in the event of load dump arising from disconnection of an output terminal of the electric rotating machine of FIG. 1.

When the level of the output voltage VB, as elevated immediately after the lower arm MOS transistor 51 is kept off for a given period of time, is greater than or equal to the first threshold value V1, the period of time T0 (i.e., the off-duration) for which the MOS transistor 51 is to be turned off next is set shorter than the time lag Tr, as demonstrated in FIG. 12. This enables the MOS transistor 51 to be turned on quickly as compared with when the fact that the output voltage VB has exceeded the first threshold value V1 is detected, and the MOS transistor 51 is then turned on again. This avoids an undesirable rise in the output voltage VB due to a delay in turning on the MOS transistor 51.

Second Method

Figure 13:
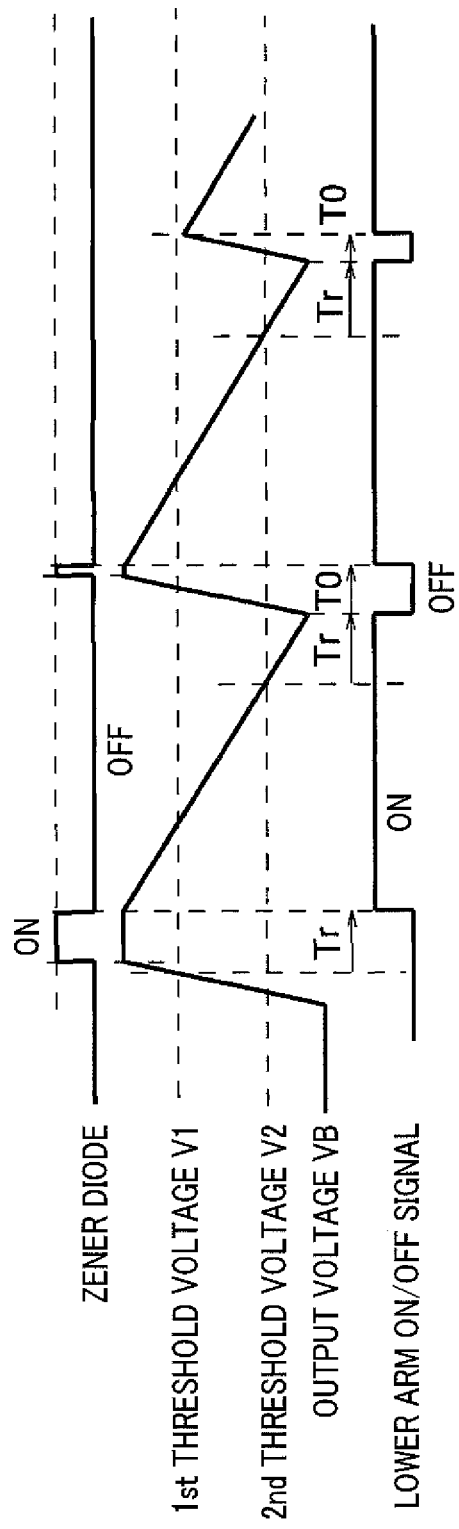
FIG. 13 is a time chart of a modification of a load dump protection operation in the event of load dump arising from disconnection of an output terminal of the electric rotating machine of FIG. 1.

When the level of the output voltage VB, as elevated immediately after the lower arm MOS transistor 51 is kept off for a given period of time, is, as illustrated in FIG. 13, greater than or equal to the first threshold value V1, the period of time T0 (i.e., the off-duration) for which the MOS transistor 51 is to be turned off next is set smaller than half the given period of time (i.e. the period of time T0) for which the MOS transistor 51 was kept off last time or one off-cycle earlier. When the half of the given period of time is shorter than a predetermined lower limit, the period of time T0 is set to the lower limit. This method is due to the expectation that the time when the MOS transistor 51 is turned on again will be delayed undesirably and set the period of time T0 to compensate for such a delay, thereby avoiding an undesirable rise in the output voltage VB due to the delay in turning on the MOS transistor 51.

Third Method

Figure 14:
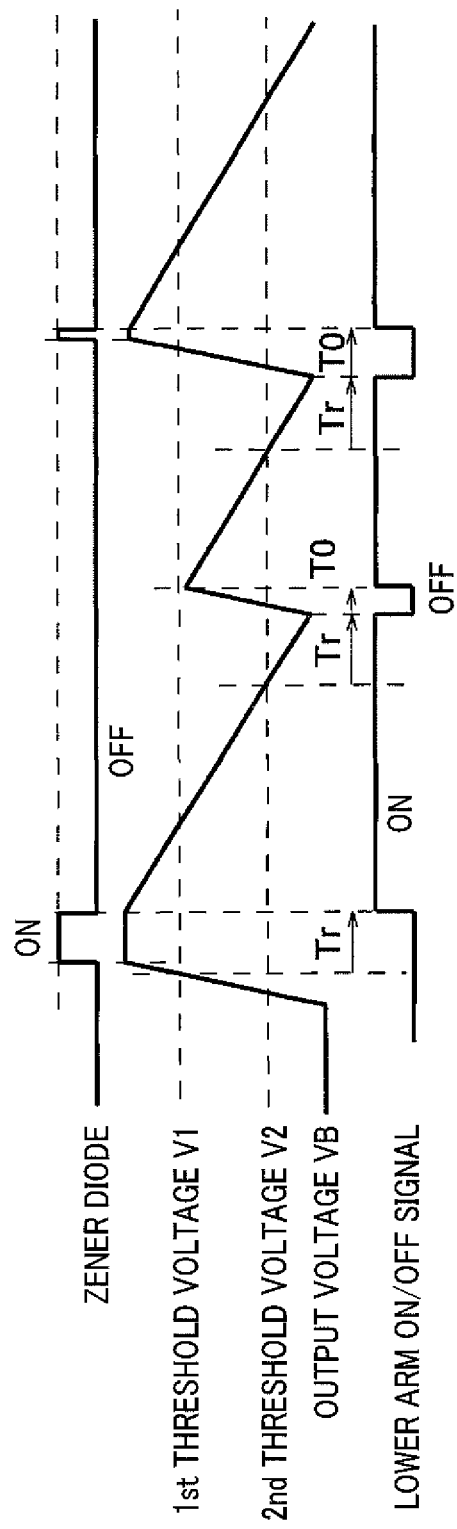
FIG. 14 is a time chart of a second modification of a load dump protection operation in the event of load dump arising from disconnection of an output terminal of the electric rotating machine of FIG. 1.

When the level of the output voltage VB, as elevated immediately after the lower arm MOS transistor 51 is kept off for a given period of time, is, as illustrated in FIG. 14, between the first threshold value V1 and the second threshold value V2, the period of time T0 (i.e., the off-duration) for which the MOS transistor 51 is to be turned off next is selected to be two times or more longer than the given period of time (i.e. the period of time T0) for which the MOS transistor 51 was kept off last time. This method is to avoid early turning on of the MOS transistor 51 next time and postpone the time when the MOS transistor 51 is to be turned on next, thereby ensuring enough time to keep the MOS transistor 51 off. This avoids an undesirable rise in output voltage VB.

The period of time (i.e., the off-duration) may be determined in either of the above first and second methods. The third method may be used in combination with one of the first and second methods.

As apparent from the above discussion, when the load dump resulting from the battery terminal disconnection has occurred, the control circuit 54 of the alternator 1 works to perform the first load dump protection operation to suppress a voltage surge developed in the alternator 1. Particularly, when a rate at which the level of the output voltage VB increases or decreases is less than a given value, the control circuit 54 waits for starting the load dump protection until the time when the occurrence of a voltage surge is expected to be eliminated is reached and then performs it, thus minimizing adverse effects of the voltage surge on the electric loads 10. The load dump arising from the output terminal disconnection results in a quick rise in level of the output voltage VB. The control circuit 54 is, therefore, permitted to commence the second load dump protection operation immediately, thereby eliminating the voltage surge quickly and ensuring the reliability in operation of the alternator 1.

The first load dump protection operation is performed both when the lower arm MOS transistor 51 is turned on and when the lower arm MOS transistor 51 is turned off, thus eliminating voltage spikes arising from the load dump completely. Upon detection of the load dump, the second load dump protection operation is immediately commenced, thus suppressing the development of the voltage surge quickly.

In the event of the load dump, the second load dump operation works to calculate a period of time for which the lower arm MOS transistor 51 is kept off so as to compensate for a time lag in operation of the controller 100, thus avoiding an undesirable increase in duration for which the MOS transistor 51 is to be turned off to eliminate a risk of an excessive rise in output voltage from the alternator 1 during the second load dump protection operation.

The determination of a rate at which the output voltage VB increases or decreases is achieved by measuring the time it takes for the output voltage VB to change between the first threshold value V1 and the second threshold value V2, thus eliminating the need for an additional structure in the alternator 1.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modifications to the shown embodiment which can be embodied without departing from the principle of the invention as set forth in the appended claims.

For instance, the alternator 1 may be designed to include either one of the stator windings 2 and 3 and a corresponding one of the rectifier module groups 5 and 6.

The alternator 1 has been explained above as performing the rectifying operation (i.e., power generation) using the rectifier modules 5X, 5Y, 5Z, 6U, 6V, and 6W, but may alternatively be designed to control on- and off-times of the MOS transistor 50 and 51 to convert dc current, as supplied from the battery 9, into ac current and supply it to the stator windings 2 and 3, thereby operating the alternator 1 in a motor mode.

Each of the rectifier module groups 5 and 6 may alternatively equipped with two or more than three rectifier modules.

Each of the rectifier modules 5X, 5Y, 5Z, 6U, 6V, and 6W works to control the synchronous rectification through a corresponding one of the X-phase winding, the Y-phase winding, and the Z-phase winding, the U-phase winding, the V-phase winding, and the W-phase winding, but however, the alternator 1 may be engineered to have a single rectification controller for all the X-phase winding, the Y-phase winding, and the Z-phase winding, the U-phase winding, the V-phase winding, and the W-phase winding.

The upper arm and the lower arm of each of the rectifier modules 5X, 5Y, 5Z, 6U, 6V, and 6W include the MOS transistors 50 and 51, but however, only the lower arm may be equipped with a MOS transistor, while the upper arm may be made of a diode.

Figure 15:
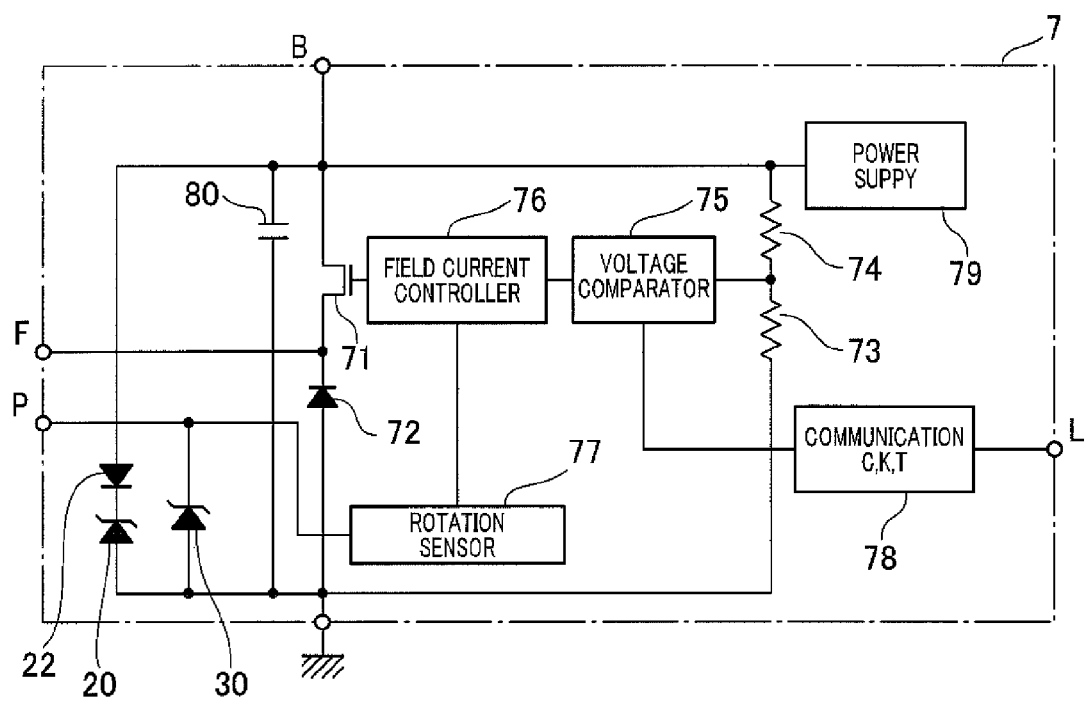
FIG. 15 is a circuit diagram which illustrates an internal structure of a modified form of the field controller of FIG. 2.

The alternator 1 is equipped with the Zener diodes 20 and 30 and the diode 22 which are all arranged outside the field controller 7, but however, the field controller 7, as illustrated in FIG. 15, may be designed to have the Zener diodes 20 and 30 and the diode 22 installed therein. This eliminates the need for installing each of the Zener diodes 20 and 30 and the diode 22 in the alternator 1 independently from the field controller 7, thus facilitating the production of the alternator 1. Only one or two of the Zener diodes 20 and 30 and the diode 22 may be disposed inside the field controller 7. The capacitor 80 may be arranged outside the field controller 7.

In the event of the load dump resulting from the output terminal disconnection, the second load dump protection operation is executed by the second protection circuit 220, as illustrated in FIG. 5, to turn off the lower arm MOS transistor 51 for a set period of time when the output voltage VB has dropped below the second threshold value V2 and then turn it on again, however, may alternatively be engineered to keep the MOS transistor 51 off until the output voltage VB reaches the first threshold value V1. Such a load dump protection operation may be achieved by designing the second protection circuit 220 to turn on the MOS transistor 51 when the output from the voltage change determiner 211 of the first protection circuit 210 is placed at the high level.

What is claimed is:

1. An electric rotating machine for a vehicle comprising:
an armature winding which includes two or more phase windings;
a switching unit which works to rectify voltage induced in the armature winding, the switching unit being equipped with a bridge circuit which includes a switching device having a diode connected parallel thereto, the switching device serving as a lower arm switching device forming a lower arm of the bridge circuit;
a controller which works to turn on or off the lower arm switching device;
a capacitor connected parallel to an output of the switching unit;
a voltage change monitor which works to monitor an output voltage from the switching unit to determine a rate at which the output voltage changes; and
a load dump protector which works to selectively perform a first load dump protection operation and a second load dump protection operation to suppress development of a voltage surge arising from load dump, wherein:
when the rate, as determined by the voltage change monitor, is smaller than a given value, the load dump protector initiates the first load dump protection operation when development of the voltage surge is expected to be suppressed,
when the rate, as determined by the voltage change monitor, is greater than the given value, the load dump protector initiates the second load dump protection operation regardless of the time when the development of the voltage surge is expected to be suppressed,
in a mode of the first load dump protection operation, the load dump protector monitors the output voltage from the switching unit and, (1) when the output voltage has exceeded a first threshold value, the load dump protector issues an on-instruction to the controller to turn on the lower arm switching device at a time when the voltage surge is expected to be eliminated, and (2) when, after exceeding the first threshold value, the output voltage has dropped below a second threshold value, the load dump protector issues an off-instruction to the controller to turn off the lower switching device at a time when the voltage surge is expected to be eliminated,
the voltage surge is expected to be eliminated when a voltage across terminals of the switching device is below a reference voltage that is lower than 0V, and
in a mode of the second load dump protection operation, the load dump protector monitors the output voltage from the switching unit and, when the output voltage has exceeded a first threshold value, issues an on-instruction to the controller to turn on the lower arm switching device, and when, after exceeding the first threshold value, the output voltage has dropped below a second threshold value, the load dump protector issuing an off-instruction to the controller to turn off the lower arm switching device.

2. An electric rotating machine as set forth in claim 1, wherein in the mode of the second load dump protection operation, when the output voltage has dropped below the second threshold value, the load dump protector outputs an off-instruction to the controller for a first period of time to turn off the lower arm switching device and then outputs an on-instruction to the controller to turn on the lower arm switching device after an elapse of the first period of time.

3. An electric rotating machine as set forth in claim 1, wherein when a period of time required for the output voltage from the switching unit to rise from the second threshold value to the first threshold value is more than or equal to a second period of time, the rate, as determined by the voltage change monitor, is determined to be smaller than the given value.

4. An electric rotating machine as set forth in claim 1, wherein when a period of time required for the output voltage from the switching unit to drop from the first threshold value to the second threshold value is longer than or equal to a third period of time, the rate, as determined by the voltage change monitor, is determined to be smaller than the given value.

* * * * *